United States Patent
Waring

[11] 3,981,324
[45] Sept. 21, 1976

[54] COMBINED VALVE AND OUTAGE GAUGE

[76] Inventor: Doyle Waring, Rte. 2, Box 262-B, Heber Springs, Ark. 72543

[22] Filed: Aug. 29, 1975

[21] Appl. No.: 609,007

[52] U.S. Cl. .............................. 137/556.6; 73/298; 137/577; 137/588
[51] Int. Cl.² ......................................... F16K 37/00
[58] Field of Search ............... 137/556.6, 209, 212, 137/577, 588, 590, 592, 133, 625.19; 222/49, 50, 464; 73/290 R, 298

[56] References Cited
UNITED STATES PATENTS

| | | | |
|---|---|---|---|
| 2,377,343 | 6/1945 | Holicer | 73/298 |
| 3,554,224 | 1/1971 | Kirk | 137/625.19 |

*Primary Examiner*—Robert G. Nilson
*Attorney, Agent, or Firm*—Berman, Aisenberg & Platt

[57] ABSTRACT

A combined service valve and outage indicator for a liquified gas tank, consisting of a valve body engagable in the neck of a liqufied gas container. The valve body has a main screw valve element engagable in a seat in the body to control the flow of gas from the container to a service outlet. The valve element has an operating knob with an indicating pointer overlying a volume scale disc secured on the valve body. Secured to the inlet end of the valve body is a depending cylindrical chamber closed at its bottom end and having spirally arranged holes. A tubular sleeve is rotatably and sealingly engaged in the cylindrical chamber and has a vertical slot or recess registrable progressively with the holes. The top end of the tubular sleeve communicates with a cavity in the chamber leading to a vent passage in the valve body controlled by a screw valve. With the last-named screw valve open, liquid gas will appear at the outer end of the vent passage when the operating knob is turned in an opening direction to a position wherein the tube slot or recess registers with a hole at the level of the liquified gas in the associated chamber, giving an indication on the scale showing said volume of liquified gas remaining in the chamber.

16 Claims, 12 Drawing Figures

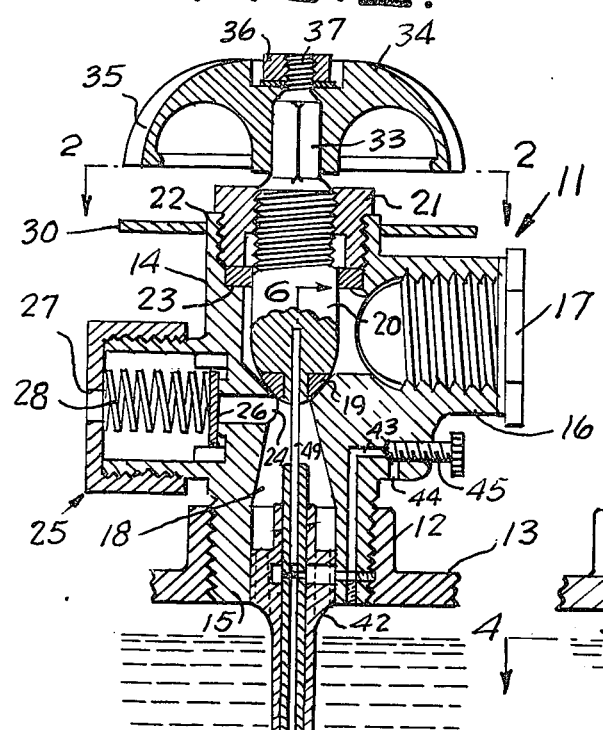
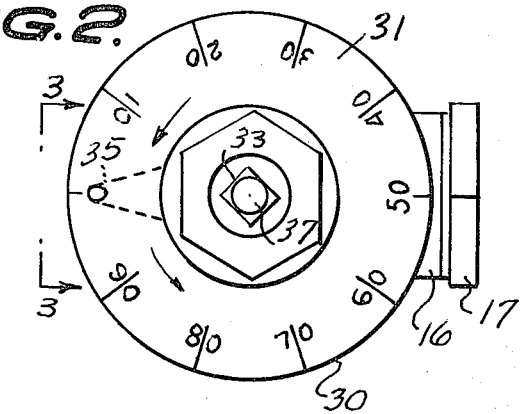
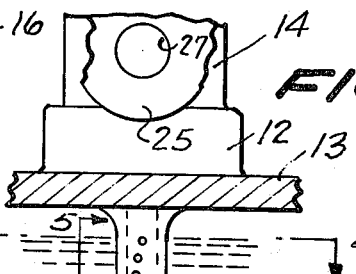
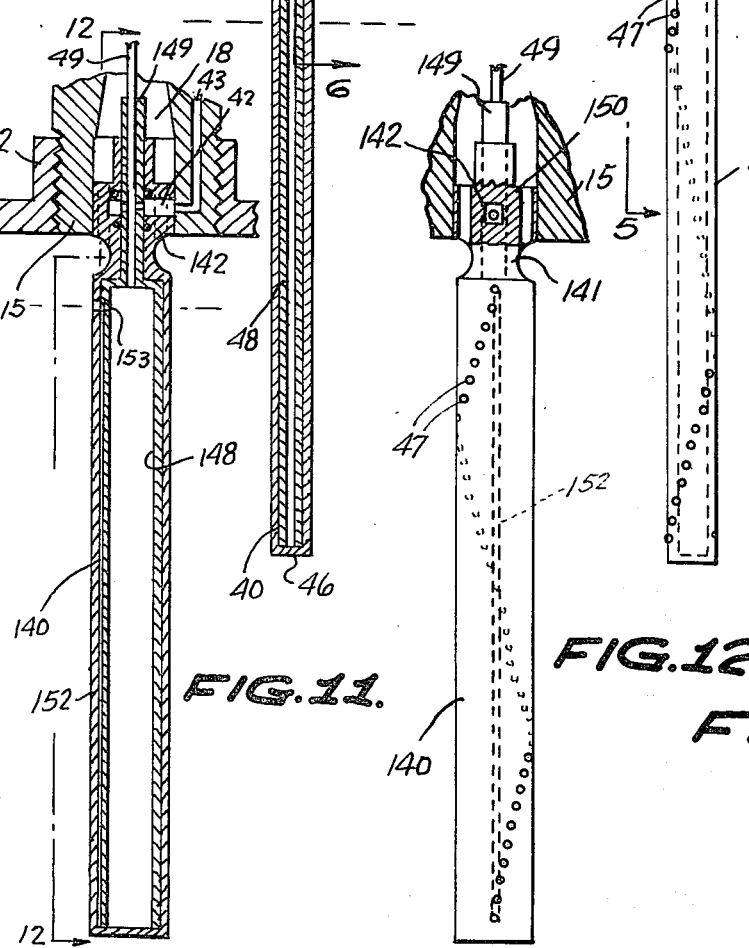
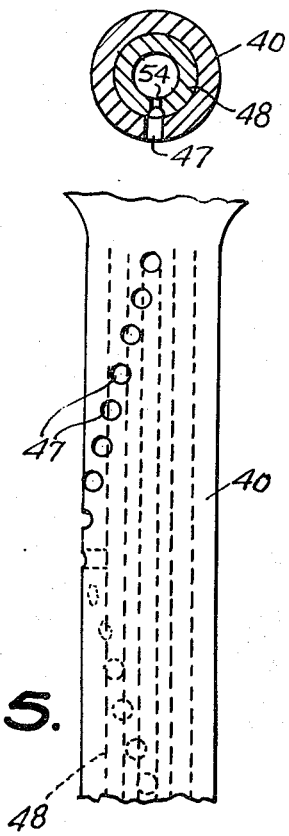
FIG. 1. FIG. 2. FIG. 3. FIG. 4. FIG. 5. FIG. 11. FIG. 12.

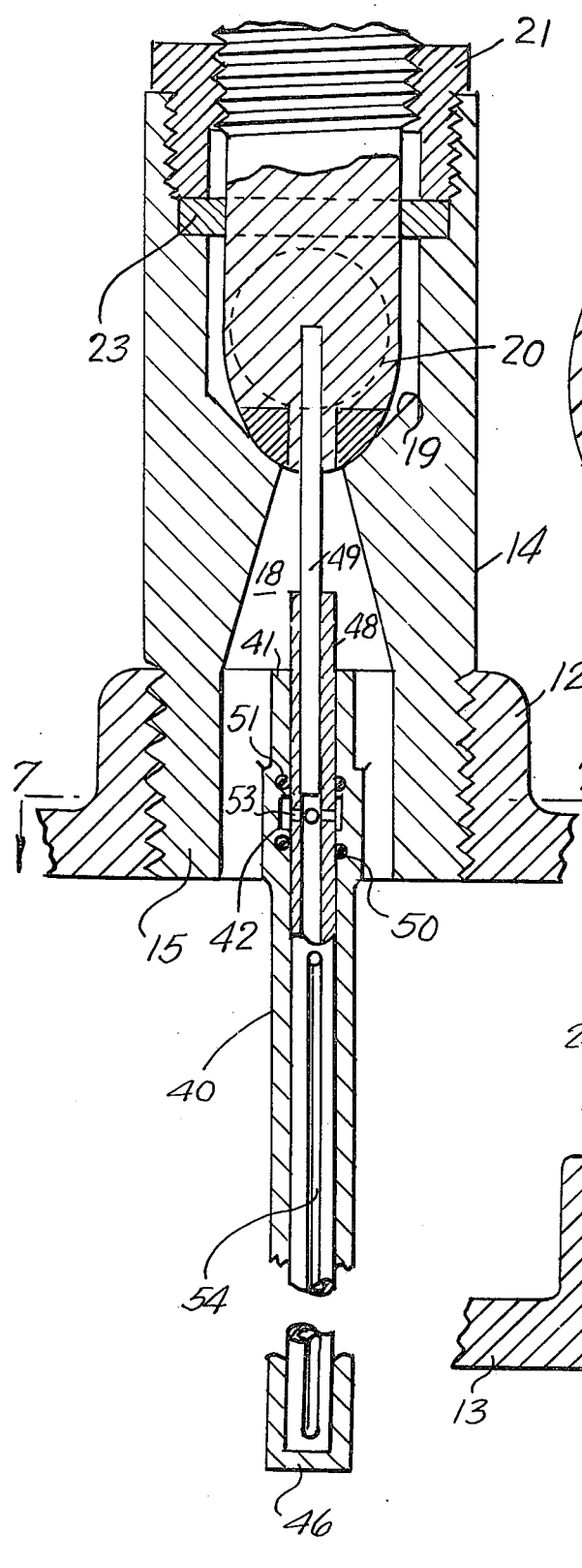
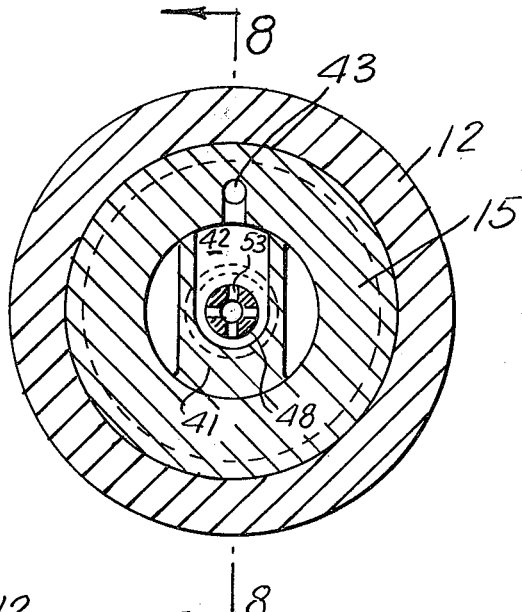
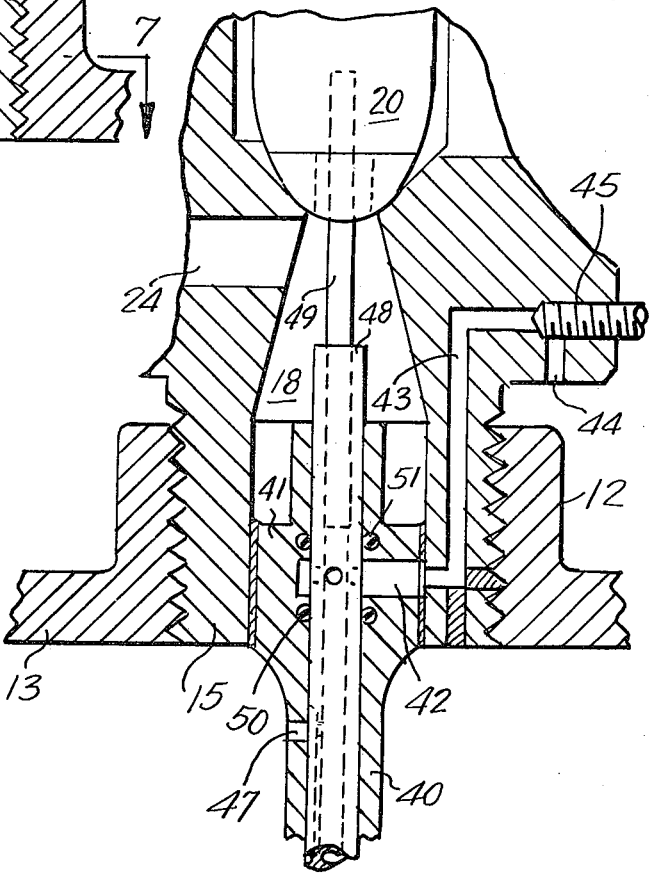

COMBINED VALVE AND OUTAGE GAUGE

This invention relates to control fittings for liquified gas containers, such as containers of liquified petroleum gas, including butane and similar fuels, and more particularly to a combined service valve and outage indicator for a liquified gas container.

A main object of the invention is to provide a combined service valve and outage indicator assembly for a liquified gas container, said assembly being relatively simple in construction, being easy to operate, and including reliable means for accurately indicating the level of liquified gas remaining in the associated tank or container.

A further object of the invention is to provide an improved combined service valve and outage indicator assembly which is inexpensive to manufacture, which is durable in construction, which is very compact in size, and which can be easily installed on a conventional liquified gas tank or container in place of an ordinary service valve and without requiring any modification of the tank or container.

A still further object of the invention is to provide an improved combined service valve and outage indicator for a liquified gas container, the assembly being of the type having a rotatable service valve-controlling knob connected to a valve element and being further provided with an indicating scale subjacent the knob for at times indicating the liquified gas remaining in the associated tank by observing the point at which liquified gas emerges from a controlled vent orifice in the assembly.

Further objects and advantages of the invention will become apparent from the following description and claims, and from the accompanying drawings, wherein:

FIG. 1 is a vertical cross-sectional view taken through an improved combination service valve and outage indicator according to the present invention, shown mounted in the neck of a liquified gas tank.

FIG. 2 is a top view of the assembly of FIG. 1 with the operating knob removed and the pointer element thereof shown in dotted view, such view being taken substantially on line 2—2 of FIG. 1.

FIG. 3 is a fragmentary vertical cross-sectional view taken substantially on line 3—3 of FIG. 2.

FIg. 4 is an enlarged horizontal cross-sectional view taken substantially on line 4—4 of FIG. 3.

FIG. 5 is an enlarged fragmentary elevational view taken substantially on line 5—5 of FIG. 3.

FIG. 6 is an enlarged fragmentary vertical cross-sectional view taken substantially on line 6—6 of FIG. 1.

FIG. 7 is a horizontal cross-sectional view taken substantially on line 7—7 of FIG. 6.

FIG. 8 is a fragmentary vertical cross-sectional view taken substantially on line 8—8 of FIG. 7.

FIG. 11 is a vertical cross-sectional view taken through the lower portion of a modified form of combined service valve and outage indicator assembly according to the present invention.

FIG. 12 is a vertical cross-sectional view taken substantially on line 12—12 of FIG. 11.

A prime purpose of the present invention is to provide a combination service valve device provided with outage indication means which can be made at low cost and which has a minimum number of moving parts.

Furthermore, the objective herein is also to provide easy reading of the indicating gauge dial and to provide an accurate indication of the reserve liquid gas remaining in the associated tank.

A further aim of the present invention is to provide a gauge device in a service valve which does not employ movable needles, floats, gears, or other wearable parts.

Further features of the present invention are the provision of orifices exposed to wiping action to prevent clogging, as well as a dependable and reliable sealing arrangement so that outage indications will be accurate and precise.

A still further aim of the present invention is to provide a combination service valve and outage indicator especially applicable to portable uses, such as in camping and similar applications, or in conjunction with mobile vehicles such as fork lift trucks or the like, where compactness and durability are important.

Another purpose of the present invention is to provide an improved combination service valve and outage indicator assembly which is not readily susceptible to leakage and which provides improved safety and economy.

Figure 9:
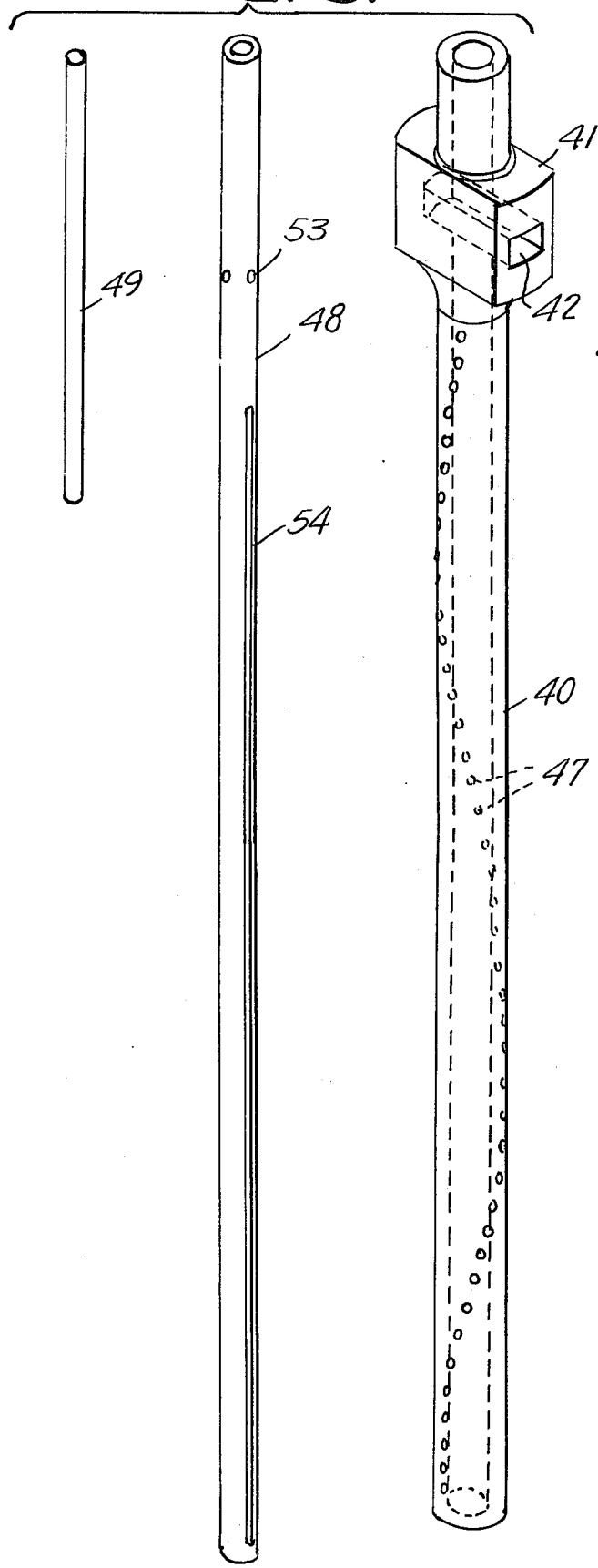
FIG. 9 is a perspective view of the components of the outage indicator device employed with the assembly of FIGS 1 - 8.
Figure 10:
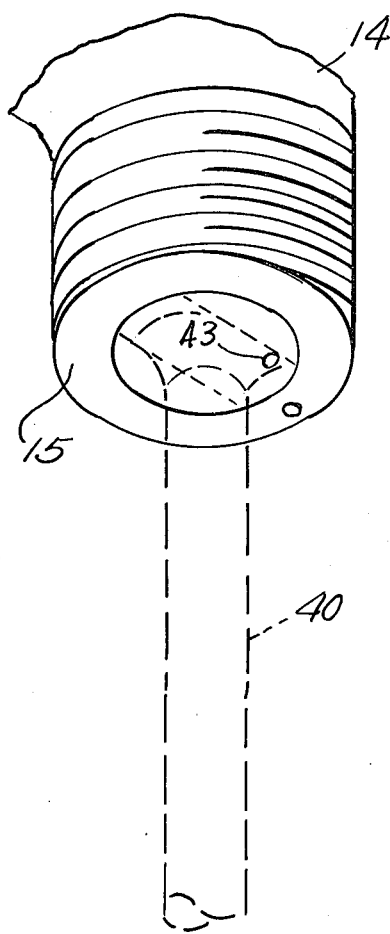
FIG. 10 is an enlarged fragmentary perspective view of the inlet end of the valve body forming part of the assembly of FIGS. 1 - 8.

Referring to the drawings, and more particularly to FIGS. 1 through 10, 11 generally designates an improved combined service valve and outage indicator according to the present invention shown mounted in the neck 12 of a liquified gas tank 13. The combined valve and indicator assembly 11 comprises a valve body 14 provided with an externally threaded bottom intake conduit portion 15 which is threadedly and sealingly engagable in the container neck 12, as shown in FIG. 1. The valve body 14 is provided at its upper portion with a laterally extending gas transmission conduit 16 which is shown sealed by a cover plug 17 threadedly engaged therein, but which can be removed to allow connection to conduit means leading to appliances with which the associated liquified gas is to be used. The valve body 14 is provided with a passage 18 leading from the intake conduit element 15 to the outlet conduit element 16 and including a valve seat 19. A main valve element 20 is threadedly engaged with a bushing element 21, which is in turn threadedly engaged in the upwardly extending, generally cylindrical top end 22 of valve body 14. An annular sealing gasket 23 is provided between the bushing 21 and an annular gasket seat therefor formed in the valve body 14, as shown in FIG. 1.

The valve body 14 is provided with a relief passage 24 leading to a relief valve assembly, designated generally at 25, which includes a spring biased yieldable closure disc 26 normally blocking the passage 24 but yieldable when excessive pressure is developed in the space 18, so as to allow the pressure to be dissipated through the vent opening 27 of assembly 25. Thus, the relief valve spring 28 will yield under excessive gas pressure in the space 18 and allow the closure disc 26 to open.

Rigidly secured on and surrounding the top element 22 of valve body 14 is a calibrated scaled disc 30 having inscribed thereon a suitable volumetric scale, such as a percentage scale 31, showing different percentages of full volume in the associated tank. The top end of the valve element 22 comprises a squared stem portion 33 on which is lockingly clamped a knob 34 having at one side thereof a tapered pointer element 35 overlying the scale 31. Knob 34 is rigidly secured on the top end of stem 33 by a nut 36 engaged with the reduced threaded top stud portion 37 of stem 33.

Designated at 40 is a depending tubular chamber, which may be cylindrical in shape, having a transversely extending integral top head portion 41 which is rigidly secured in the lower end of the inlet conduit portion 15 of valve body 14. Head member 41 is provided with a cavity or passage 42 which is in communication with a passage 43 formed in member 15 leading to a vertical downwardly opening vent port 44. A screw valve element 45 is threadedly engaged in the body 14, located immediately below the outlet conduit element 16 thereof, and being sealingly engagable with the end of passage 43 to seal it from port 44.

As shown in FIG. 8, the downwardly directed port 44 is at right angles to the top end of the passage 43 and the valve screw 45 is engagable in the end of passage 43 so as to block off port 44 from passage 43. By unscrewing the valve element 45, communication can be established between passage 43 and 44, so as to allow escape of liquified gas therethrough in a manner presently to be described.

The tubular chamber 40 has a bottom wall 46, thereby closing off the bottom of the tubular member 40. Said tubular member 40 is formed with a spirally arranged row of apertures 47 extending substantially for the full length of member 40 and extending approximately 360° around the axis of said tubular member 40. The apertures 47 are relatively closely spaced so as to respond to closely separated intervals of liquid height in the member 40, as will be presently described. Rotatably and sealingly disposed in the tubular chamber 40 is a sleeve member 48 which is axially connected by a top rod 49 to the bottom end portion of the main valve element 20. Annular sealing gaskets, such as O-rings or the like, are provided around the sleeve member 48, as shown at 50, 51 in FIG. 6, said annular gaskets 50, 51 being respectively located immediately below and immediately above the cavity 42. However, it is recognized that gaskets 50, 51 may be omitted, if desired. Between said annular gaskets, the sleeve member 48 is formed with apertures 53 establishing communication between the interior of the sleeve member 48 and the space 42.

Sleeve member 48 is formed with an elongated, relatively narrow slot 54 extending lengthwise thereof and traversing the spirally arranged row of apertures 47, so that the slot 54 registers with selected apertures 47 in accordance with the rotational position of sleeve 48, and hence, in accordance with the rotational position of knob 34. Thus, with vent screw 45 open, when the operating knob 38 is rotated in an opening direction, the slot 54 will register with a hole 47 at the level of the liquid gas in the associated container 13, at which point the liquid gas will be forced upwardly through the sleeve 48, the passages 53, the space 42, the passage 43 and thence through the port 44, providing a visual indication that the liquid level has been reached in the associated container 13. The point at which the liquid gas emerges from the port 44 will be indicated by pointer 35 with reference to scale 31. This will provide an indication of the amount of liquified gas remaining in the associated container.

It will be understood that the above-described operation may be accomplished either with the device connected to appliances or with the closure plug 17 sealingly installed in the conduit 16. To provide the outage indication, all that is necessary is that the screw valve 45 be opened and the knob 34 be rotated in an opening direction so as to cause the vertical slot 54 to cross the spirally arranged holes 47. As soon as the slot 54 reaches the hole 47 at the level of liquified gas in the container, the liquified gas will enter the sleeve member 48 and be forced through the passages connected thereto, as above described, and will emerge at the port 44.

Referring now to the modified form of the apparatus shown in FIGS. 11 and 12, the depending cylindrical chamber, shown at 140 is provided with the spirally arranged holes 47, as in the previously described form of the invention, and is integrally formed with the top neck portion 141 which merges with the top head portion 142. The top head portion 142 is rigidly secured in the lower end of the space 18 and is provided with a cavity 42 similar to that of the previously described embodiment of the invention. Sealingly and rotatably disposed inside the cylindrical chamber 140 is a sleeve member 148 having the tubular top stem portion 149 which is connected axially to the main screw valve element 20 by the rod 49. The interior of sleeve 148 communicates with cavity 42 through apertures 150 provided in stem 149. The sleeve member 148 is formed with a vertical groove 152 which extends lengthwise on the sleeve member and which crosses the spirally arranged row of apertures 47. At the top end of the groove 152 the sleeve member has an aperture 153 which connects the groove to the interior of sleeve member 148. As in the previously described form of the invention, when the operating knob 34 is rotated in an opening direction, the groove 152 will intersect the spirally arranged pattern of apertures 47 at an aperture corresponding to the top level of the liquified gas in the associated container, at which point, the liquified gas will flow into the interior of the sleeve 148 and thence upwardly through stem 149, space 42 and passage 43 to the vent opening 44 (with control valve screw 45 open) and will emerge from the port 44, showing the level of liquified gas in the associated container that has been reached. This level will be indicated by the pointer 35 on the underlying scale 31 in the same manner as described above in connection with the previously disclosed embodiment of the invention.

It will be understood that in either of the forms of the invention, specifically described herein, with the screw valve 45 closed, the service valve portion of the device can be operated in its normal manner. However, to obtain an indication of the level of remaining liquified gas in the associated container, it is merely necessary to open the screw valve element 45 and operate the knob 34 in the manner above described, namely, rotating the knob 34 in an opening direction from its closed position, and observing the point at which liquified gas emerges from the port 44. It is understood that when the tank 13 and valve are connected to an appliance and the valve element 20 is in an open position the knot 34 may be turned in either direction to permit the gas to emerge from port 44 under observation. This allows the continued use of the appliance while finding the liquid level of the tank, thereby permitting gauging of the tank contents without shutting off the gas supply to lighted appliances and thereafter re-lighting them.

While certain specific embodiments of an improved combined service valve and outage indicator for a liquified gas container have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combined service valve and outage indicator for a liquified gas container comprising a valve body provided with means sealingly engagable with the outlet conduit of a gas container and having a gas transmission passage including a valve seat, a main valve element threadedly engaged in the valve body and being engagable with said valve seat, operating knob means connected to said valve element, means on the valve body adjacent said knob means for indicating the degree of rotation of said knob means, a depending tubular chamber secured to the inlet end of said gas transmission passage, said chamber being formed with spirally arranged inlet passage means, a tubular sleeve element rotatably mounted in said chamber, means axially connecting said sleeve element to the valve element, said sleeve element being formed with linear passage means registrable with said spirally arranged inlet passage means at points in accordance with the degree of rotation of said sleeve element, said valve body being formed with a vent port, the top end of said tubular chamber having a receiving space communicating with the top end of said sleeve element, the valve body having a passage communicatively connecting said receiving space to said vent port, and manually operated control valve means in said last-named passage for at times opening said vent port to allow liquified gas from the associated gas container to discharge through the vent port.

2. The service valve and outage indicator of claim 1 and wherein said spirally arranged inlet passage means comprises apertures formed in the tubular chamber in a spiral pattern.

3. The service valve and outage indicator of claim 1, and wherein said linear passage means comprises a slot formed lengthwise in said sleeve element.

4. The service valve and outage indicator of claim 1, and wherein said means indicating the degree of rotation of said knob means comprises a calibrated disc element on the valve body subjacent said operating knob means.

5. The service valve and outage indicator of claim 1, and wherein said manually operated control valve means comprises a headed screw valve element threadedly engaged in the valve body and being sealingly engagable with said last-named passage.

6. The service valve and outage indicator of claim 1 and wherein the means axially connecting said sleeve element to the valve element comprises an axial rod connecting the top end of the sleeve element to the bottom end of the valve element.

7. The service valve and outage indicator of claim 6, and wherein the top end of the sleeve element is formed with at least one aperture communicating with said receiving space.

8. The service valve and outage indicator of claim 7, and wherein said depending tubular chamber is in the form of a cylinder having a closed bottom end.

9. The service valve and outage indicator of claim 8, and wherein said means indicating the degree of rotation of said knob means comprises a disc element secured on the valve body subjacent said operating knob means, said disc element having a volumetric scale and the knob means having a pointer element overlying said scale.

10. The service valve and outage indicator of claim 9, and wherein said valve body has an outlet conduit at the end of said gas transmission passage and wherein said manually operated control valve means is located subjacent said outlet conduit.

11. A combined service valve and outage indicator for a liquified gas container comprising a valve body provided with means sealingly engagable with the outlet conduit of a gas container and having a gas transmission passage including a valve seat, said passage having its lower end adapted to communicate with said outlet conduit, a main valve element in said valve body engagable with said valve seat, operating handle means connected to said valve element, indicator means on said valve body for indicating the degree of operating movement of said handle, gas venting means in said body, an elongated hollow member depending from said valve body and having its upper end located in said lower end of said gas transmission passage, gas passage means in said hollow member in communication with said venting means and operatively connected to said handle for permitting the egress of gas from an associated liquified gas container through said gas passage means and venting means to said indicator means.

12. The combined service valve and outage indicator of claim 11 wherein said hollow member includes an outer tube and an inner tube, said outer tube being fixed and said inner tube being rotatable within said outer tube.

13. The combined service valve and outage indicator of claim 12, and means axially connecting said inner tube to said main valve element for rotation therewith.

14. The combined service valve and outage indicator of claim 13, and manually operated control valve means in said venting means for opening and closing said venting means.

15. The combined service valve and outage indicator of claim 13 wherein said outer tube is provided with spirally arranged inlet passage means, and said inner tube is provided with linear passage means registrable with said spirally arranged means at points in accordance with the degree of rotation of said inner tube.

16. The combined service valve and outage indicator of claim 11 wherein said gas passage means includes an opening in said upper end of said hollow member communicating with said lower end of said gas transmission passage in said valve body.

* * * * *